United States Patent [19]

Rasenberger

[11] 4,416,198
[45] Nov. 22, 1983

[54] DRIVE FOR PRODUCING MOTION WITH DWELLS

[75] Inventor: Otto Rasenberger, Emmendingen, Fed. Rep. of Germany

[73] Assignee: Heidelberger Druckmaschinen AG, Heidelberg, Fed. Rep. of Germany

[21] Appl. No.: 370,622

[22] Filed: Apr. 22, 1982

[30] Foreign Application Priority Data

Apr. 23, 1981 [DE] Fed. Rep. of Germany ....... 3116172

[51] Int. Cl.³ .................. B41F 1/07; F16H 21/32
[52] U.S. Cl. .................. 101/3 R; 101/217; 101/142; 101/352; 74/40
[58] Field of Search ........... 101/3 R, 247, 217, 142, 101/145, 177, 350, 352; 74/40, 42–45, 117–118

[56] References Cited

U.S. PATENT DOCUMENTS

| | | | |
|---|---|---|---|
| 346,635 | 8/1886 | Bechman | 74/42 |
| 667,772 | 2/1901 | Halvorson | 74/42 |
| 1,095,675 | 5/1914 | Rietti | 74/40 |
| 1,121,705 | 12/1914 | Wright | 74/118 |
| 1,656,601 | 1/1928 | Novick | 74/40 |
| 2,503,037 | 4/1950 | Georgeff | 74/40 |
| 2,523,430 | 9/1950 | Hearn | 101/3 R |
| 2,574,137 | 11/1951 | Zenner | 74/40 X |
| 2,986,909 | 6/1961 | Liebrandt et al. | 74/43 X |
| 3,345,941 | 10/1967 | Koch et al. | 74/40 X |

FOREIGN PATENT DOCUMENTS

| | | | |
|---|---|---|---|
| 428026 | 4/1926 | Fed. Rep. of Germany | 74/118 |
| 59274 | 5/1974 | France | 74/40 |

OTHER PUBLICATIONS

Machine Design "Large Oscillation Mechanisms", vol. 32, No. 23, Nov. 10, 1960, pp. 190–196.

*Primary Examiner*—E. H. Eickholt
*Attorney, Agent, or Firm*—Herbert L. Lerner; Laurence A. Greenberg

[57] ABSTRACT

Drive for producing motion with intervening dwells including a four-bar linkage defining a couple curve travel path traversible only in part and having equally coincident forward and return paths, and a dwell-producing driven rocker arm pair connected thereto, the couple curve travel path having a vertex therein dividing the couple curve travel path into a short curve path for producing a dwell and an elongated curve path extending at an angle to the short curve path for producing a movement, the vertex of the couple curve being identical with an instantaneous pole defining the start and end of the dwell.

11 Claims, 9 Drawing Figures

DRIVE FOR PRODUCING MOTION WITH DWELLS

The invention relates to a drive for producing motion with intervening dwells formed of a four-bar linkage, a couple curve path defined thereby being traversible only in part and having equally coincident forward and return paths, as well as a dwell-producing driven rocker arm pair.

Such "dwell drives" are employed in many branches of engineering, such as, for example, in constructing high quality processing machinery in machine tool construction and in precision engineering.

Especially in the case of printing presses which, as precision machinery, require drives having intervening dwells for different courses of motion, these dwells must be as perfect as possible. Furthermore, for the general purpose of increasing the rate of production, such drives must be suited for very high speeds of rotation.

Indeed, in the last-mentioned industry branch i.e. the printing industry, the solution to these problems or objections have been effected more or less exclusively by using which may be constructed for producing any desired form of motion, and thus also with the frequently desired perfect dwells.

The rate of wear of such cam drives is, however, quite high even at relatively low speeds of rotation and, at higher speeds, becomes even more serious. Furthermore, such drives require continuous monitoring or inspection, and frequent protracted maintenance operations are necessary because of the wear of individual parts of the drive. Such maintenance operations are responsible for shut-downs which are likely to be very costly in view of the high stage of development and complex construction of such machines or automatic systems. Moreover, the price of producing such a drive in the first place is very high.

For these reasons there is a need for construction of a dwell-producing linkage drive which, in addition to the advantages inherent in this sort of drive (i.e. the suitability thereof for the transmission of great forces at high speeds), may advance the art with respect to attainable, more perfect dwells, as well as for further installation and adjustment purposes.

For making dwells more perfect, in the article "Zur Weiterentwicklung der Koppelrastgetriebe"("For Further Development of Dwell-Producing Coupler Drives") in the publication Feinwerktechnik (Precision Engineering) 1950 H.I. pages 11 and 13, a drive has been suggested wherein during the dwell time, the couple point was run through four times, which, however, has the shortcoming that, because of the need for a further input drive system, the total number of moving parts was increased to ten (or fourteen in the case of two-dwell drives).

A further suggestion (note German patent No. 670 678) was the use of an eight-part coupler dwell-producing linkage drive which operates oscillatingly or reciprocatingly, using an open couple curve, the couple point being run through two times in the dwell. On this respect, a further arcuate thrust crank drive was post-connected to a first thrust crank drive, the crank of the further drive not fully revolving, however, so that the couple curve was only traversed in part.

While, in this drive, the eventual adjustability of the position and time of the dwell as well as the length of stroke were greatly limited, the system could furthermore only be used for producing approximate dwells, the start and end of which having indistinct or fluid transitions.

It is accordingly an object of the invention to provide a dwell-producing linkage drive using only a small number of linkage members or moving parts, yet the couple curve of this drive, nevertheless, affords an exact, limited dwell.

With the foregoing and other objects in view, there is provided, in accordance with the invention, a drive for producing motion with intervening dwells comprising a four-bar linkage defining a couple curve travel path traversible only in part and having equally coincident forward and return paths, and a dwell-producing driven rocker arm pair connected thereto, the couple curve travel path having a vertex therein dividing the couple curve travel path into a short curve path for producing dwell and an elongated curve path extending at an angle to the short curve path for producing a movement, the vertex of the couple curve being identical with an instantaneous pole defining the start and end of the dwell.

The sharp division of the couple curve into two curve paths by an instantaneous pole or center of velocity, as well as the only very short dwell-producing curve path makes it possible, on the one hand, for the dwell to be given exactly defined limits while, on the other hand, because the dwell producing curve is short, for the system to precisely approach the desired or nominal values.

The universally applicable basic drive system for producing the couple curve may be simply couplable with any drive and, for example, the basic drive may be powered by or form part of the main drive of any machine with which it is to be used.

Further inherent advantages of the dwell producing linkage drive of the invention are: a very large dwell angle (180° or more), a large output rocking angle (60° to 180°), a good minimum transmission angle (not less than 40°), stepless (infinite), mutually independent adjustment of the dwell angle and the output rocking angle, and long output lever arms for producing high torques.

In addition to use in machines and apparatus in which the transmission of high forces and torques is frequently necessary, the drive may be used, especially because of the highly precise dwells produced even for high precision machines amongst which printing presses are included.

In accordance with another feature of the invention, the four-bar linkage includes a bellcrank coupler having two arms with a connection point therebetween, one of the arms being connected at an articulating point to a driving rocker arm of the four-bar linkage, the other of the arms being an output arm, another rocker arm of the four-bar linkage being articulatingly connected at the connection point to the bellcrank coupler, the dwell-producing driven rocker arm pair including a dwell-producing rocker arm articulatingly connected to the output arm of the bellcrank coupler, the dwell-producing driven rocker arm pair further including an output rocker arm articulatingly connected to the dwell-producing rocker arm thereof.

In accordance with a further feature of the invention, the four-bar linkage includes a driving rocker arm, and including a thrust crank drive having a coupler connected to the driving rocker of the four-bar linkage.

In accordance with an added feature of the invention, there is provided a circular-arcuate adjustment slide disposed on the driving rocker arm of the four-bar linkage, the coupler of the thrust crank drive being connected to the driving rocker arm of the four-bar linkage via a connecting point of the adjustment slide, the connecting point being shiftable at the adjustment slide for adjusting dwell time between a maximum value and zero without varying an output rocker arm angle swept by the output rocker arm of the dwell-producing rocker arm pair.

In accordance with an additional feature of the invention, there are provided means for adjusting the dwell time during operation of the drive.

In accordance with again another feature of the invention, the other rocker arm of the four-bar linkage is directly connected by a slide to a driving crank.

In accordance with again a further feature of the invention, there is provided a further dwell drive connected to a dwell-producing basic drive formed of an assembly of the four-bar linkage and the dwell-producing driven rocker arm pair, the further dwell drive being connected via a connecting rod to a couple point with the dwell-producing basic drive and being actuable for producing two dwell angles and an output rocker arm angle, and a thrust crank drive having a centric couple curve for driving the further dwell drive.

In accordance with again an added feature of the invention, there are provided means for taking power for driving the further dwell drive from a rectilinear thrust crank movement at any location of a thrust plane.

In accordance with again an additional feature of the invention, there is provided, in combination with an embossing platen of a platen printing press, the output rocker arm of the dwell-producing rocker arm pair forming a driving link for the embossing platen, and means for effecting a dwell of the output rocker arm during embossing operation of the platen printing press.

In accordance with yet another feature of the invention, there is provided, in combination with an inking or dampening unit of a printing machine, the output rocker arm of the dwell-producing basic drive and the further dwell drive for producing two dwells forms a rocking lever for a ductor roller in the inking or dampening unit, end positions of the ductor roller being identical with positions of the dwells.

In accordance with a concomitant feature of the invention, there is provided a driven lever for transmitting motion in accordance with the elongated curve path and for producing a dwell in accordance with the short curve path, the driven lever being formed with a guide slot corresponding to the dwell-producing short curve path, the four-bar linkage including a bellcrank coupler having an output arm with an end articulatingly connected to a slide block slideable in the guide slot.

Other features which are considered as characteristic for the invention are set forth in the appended claims.

Although the invention is illustrated and described herein as embodied in a drive for producing motion with dwells, it it nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
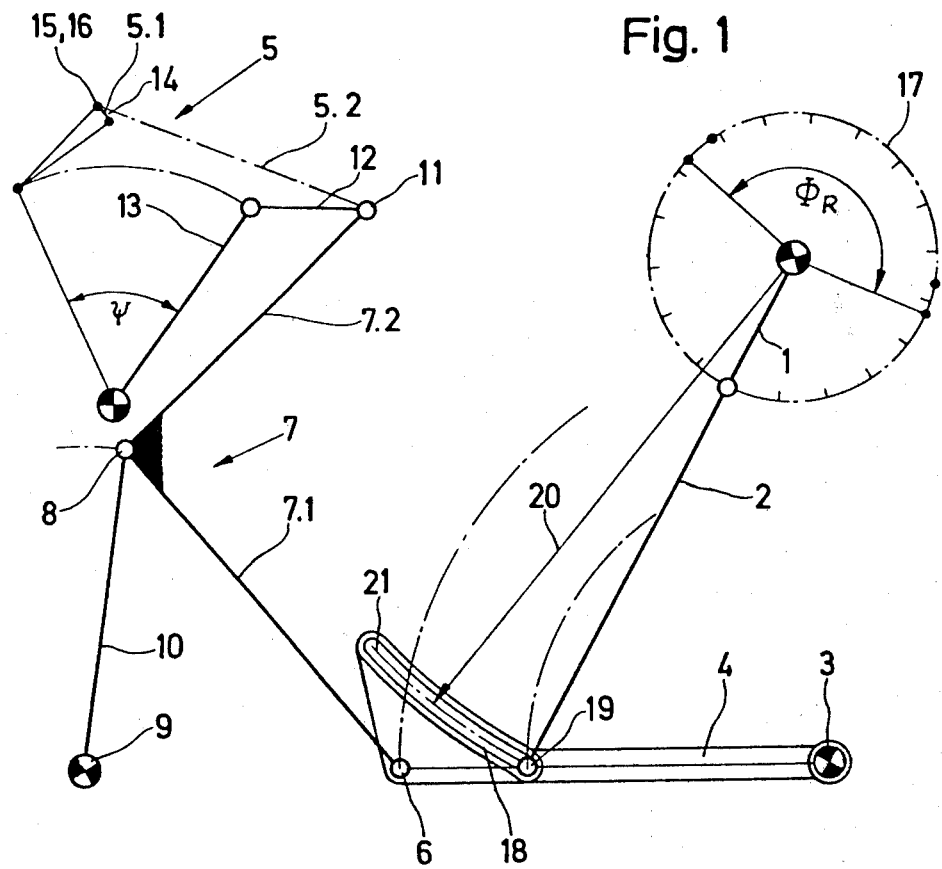
FIG. 1 is a diagrammatic view of a device for effecting motion with dwell periods therein and, more specifically, a dwell-producing linkage drive according to the invention powered by a thrust crank drive.

Referring now to the drawings and, first, particularly to FIG. 1 thereof there is shown in a basic embodiment of the invention a dwell-producing linkage drive which is set in motion by a thrust crank drive via a driving crank 1 and a coupler 2 articulatingly linked at one end thereto, the coupler 2 having the other end thereof articulatingly linked to a driving rocker arm 4 of a four bar linkage producing a highly characteristic couple curve 5, the driving rocker arm 4 being pivoted at a point 3 to a stationary frame. The four bar linkage includes, in addition to the driving rocker arm 4, a two-armed or bellcrank coupler 7 connected to the driving rocker 4 at an articulation point 6, and a rocker arm 10 articulatingly supported at a point 9 of the stationary frame and furthermore connected articulatingly to a point 8 between the two arms 7.1 and 7.2 of the coupler 7.

A dwell-producing rocker arm 12, which is one part of a rocker-arm pair 12, 13 post-connected to the four bar linkage 3, 6, 8 and 9, is connected to the end point 11 of the coupler arm 7.2 at the driven side of the linkage drive. The driven rocker arm 13 connected thereto is responsible for the development of the desired motion with an intermediate dwell. The couple curve 5 produced by the illustrated four bar linkage 3, 6, 8 and 9 is divisible or severable into a short curve path 5.1 for producing the dwell and a long curve path 5.2 disposed at an angle 14 thereto, and producing or developing desired motion.

The two curve paths 5.1 and 5.2 are sharply and clearly separated from one another by a vertex or point 15 of the couple curve 5, the vertex or point 15 of the couple curve 5 being identical with an instantaneous pole or origin 16 thus marking the start and end of the dwell. Proceeding from the basic idea of the invention for realizing this special form of the couple curve, which should furthermore be characterized by a mutually coinciding forward travel and return, the dimensions and positions of the parts of the four bar linkage 3, 6, 8 and 9 may be determined with the aid of the pole locus curve method. Assembly of the parts into the herein disclosed drive unit may be realized in a synthetic, empirical procedure, as is familiar to every man skilled in the art of drives or transmissions.

The dwell producible with this drive, 1, 2, 4, 7, 10, 12 and 13 is represented as a dwell angle $\phi_R$ on the circle 17 swept by the drive crank 1.

For the purpose of adjusting the dwell time infinitely i.e. steplessly, from an upper limiting value down to zero, the driving rocker arm 4 is provided with an adjustment slide 18 for steplessly varying the location of the connecting point 19 to the driving coupler 2, the stepless adjustment being possible even during operation of the drive. The radius 20 of curvature of the middle line 21 of the slide, in this regard, is to be provided in the outer dead position of the drive. Adjustment systems both for manual as well as automatic adjustment are quite numerous and well known so that no further details in regard thereto are necessary.

Figure 2:
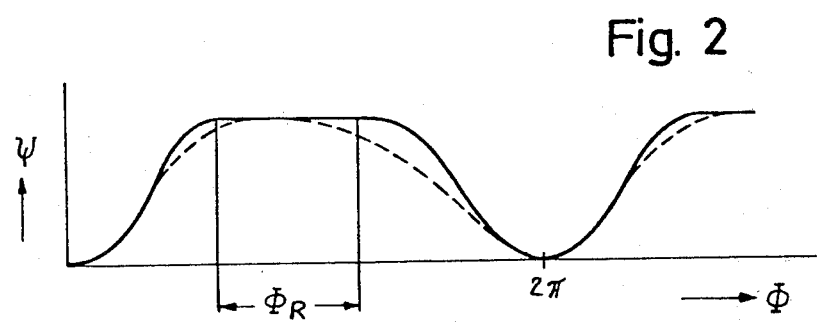
FIG. 2 is a plot diagram showing the relationship between given motion characteristics $\phi$, $\Psi$ and the adjustment range of $\phi_R$ (broken line)

The motion-time graph of FIG. 2 represents the relationship between the crank angle $\phi$ and the angle $\Psi$ of the driven rocker arm and, furthermore, the adjustment range of the dwell angle $\phi_R$ (broken line).

Figure 3:
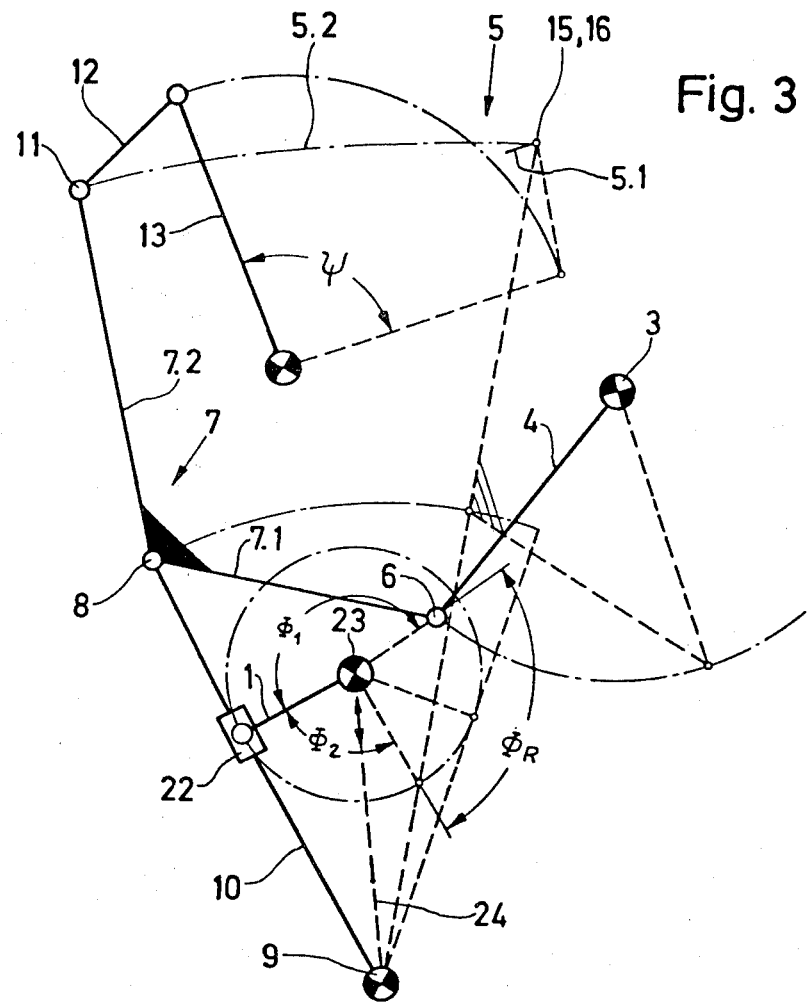
FIG. 3 is a diagrammatic view of another embodiment of the invention using a driving crank and a connecting link guide suitable for producing a very non-uniform operation in the forward and backward stroke of a driving rocker arm.

FIG. 3 shows a further driving alternative for the basic dwell-producing drive 4, 7, 10, 12, 13 wherein a crank 1 via a slide 22 drives a rocker arm 10 of a four bar linkage 3, 6, 8, 9, which then functions as a driving rocker.

A possibility of adjusting the dwell time is afforded in that the bearing point 23 of the driving crank 1 is shiftable and, in fact, in a manner that it can move along the connection line 24 to the support point 9 for the rocker arm 10 on a stationary frame through the aid of suitable non-illustrated moving means. The rocking angle of the rocker arm 10 is thereby steplessly or infinitely adjustable.

Figure 4:
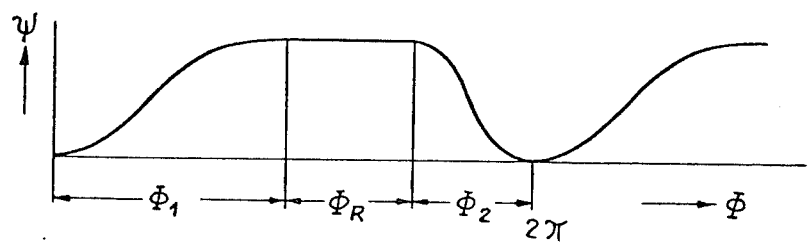
FIG. 4 is a plot diagram showing the relationship between the angle $\Psi$ of a driven rocker arm and the crank angle $\phi$ in the embodiment of FIG. 3.

The relationship between the angles $\phi$, $\Psi$ of motion in the case of a drive structure according to FIG. 3 is apparent from FIG. 4. It will be noted that forward and return travel of the driven rocker arm are very unequal which is apparent from the very assymmetrical form of the curve of the crank angles $\phi_1$ and $\phi_2$ in relation to the angle $\Psi$ of the driven rocker arm. This embodiment of the invention is therefore suited for such purposes which require uneven or non-uniform operation or motion.

Figure 5:
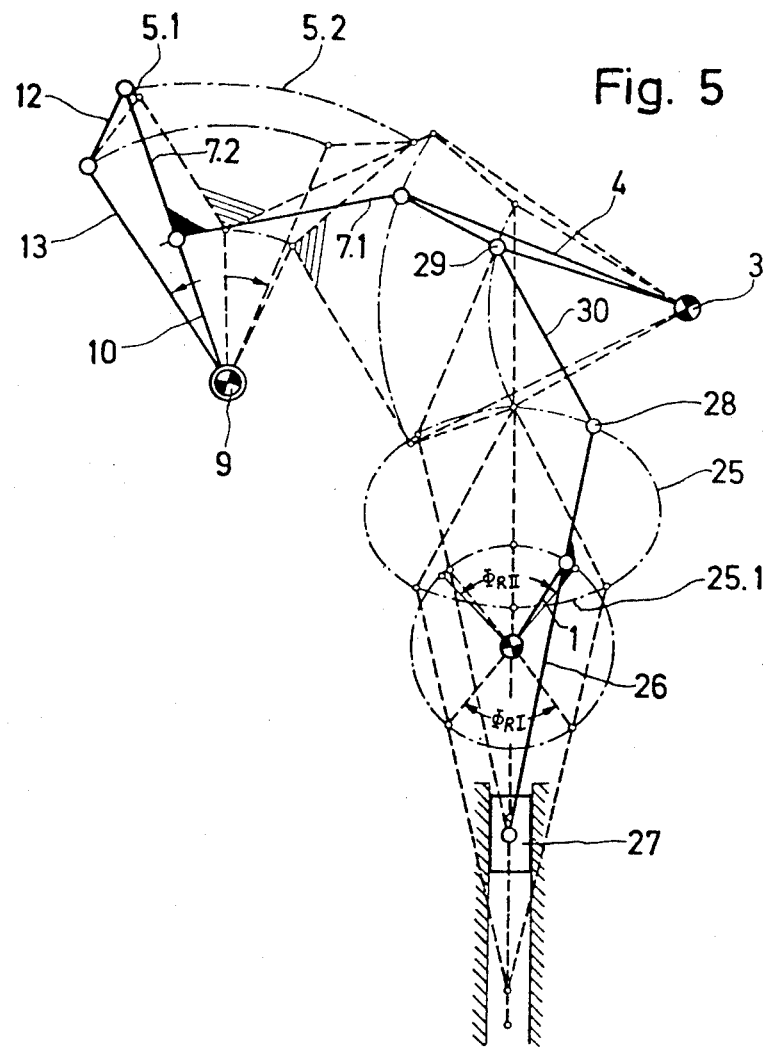
FIG. 5 is a diagrammatic view of a compound dwell-producing linkage drive, for example, for two dwell angles of equal size, adjustment of which is possible, the compound drive being a further embodiment of the basic dwell-producing drive of the invention.

FIG. 5 shows an extended application of the dwell-producing linkage drive according to the invention. The compound or combination dwell-producing linkage drive serves for producing two dwells $\phi_{RI}$, $\phi_{RII}$ and, to this end, the input part of the basic drive 4, 7, 10, 12, 13 is preceded by a further dwell-producing coupler drive of conventional construction powered by a centric couple curve 25 of a thrust crank drive used in the system and formed of a driving crank 1, a thrust rod 26 with a slide 27 as well as a connecting rod 30 which is pivoted at a driven-side link or articulating point 29 of the thrust rod 26, the rod 30 furthermore being connected at the pivot point 29 to the driving rocker arm 4 of the basic drive 4, 7, 10, 12, 13. The manner of driving employing the thrust crank drive might, in this respect, furthermore, be via the reciprocating stroke motion of the slide 27. The latter is concerned with serially connecting two dwell-producing drives for producing, in such a case, two dwells of equal size. Also, in the case of this drive, the hereinaforementioned adjustment possibilities are provided.

Figure 6:
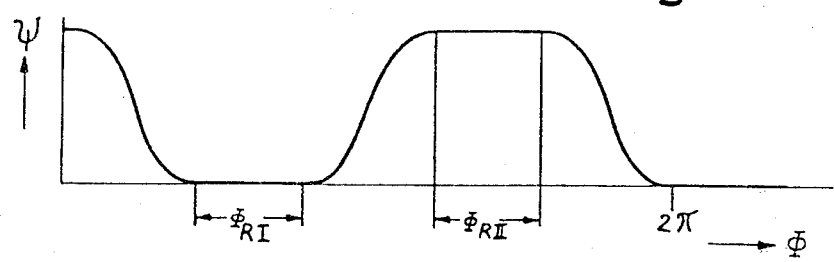
FIG. 6 is a plot diagram showing the relationship between dwell angles $\phi_{RI}$, $\phi_{RII}$, on the one hand, and a driven rocker-arm angle $\Psi$, on the other hand for the embodiment according to FIG. 5.

The relationship applicable for this compound dwell coupler drive between the crank angle $\phi$ and the output rocker angle $\Psi$ is represented in FIG. 6 in the form of a graph. The dwell angles $\phi_{RI}$ and $\phi_{RII}$ are indicated as horizontal lines, it being noted that the dwell $\phi_{RI}$ attainable with the normal dwell drive (thrust crank drive) is less perfect than the dwell $\phi_{RII}$, this being because the dwell-producing curve path 25.1 of the centric couple curve 25 is not part of a true circle.

Figure 7:
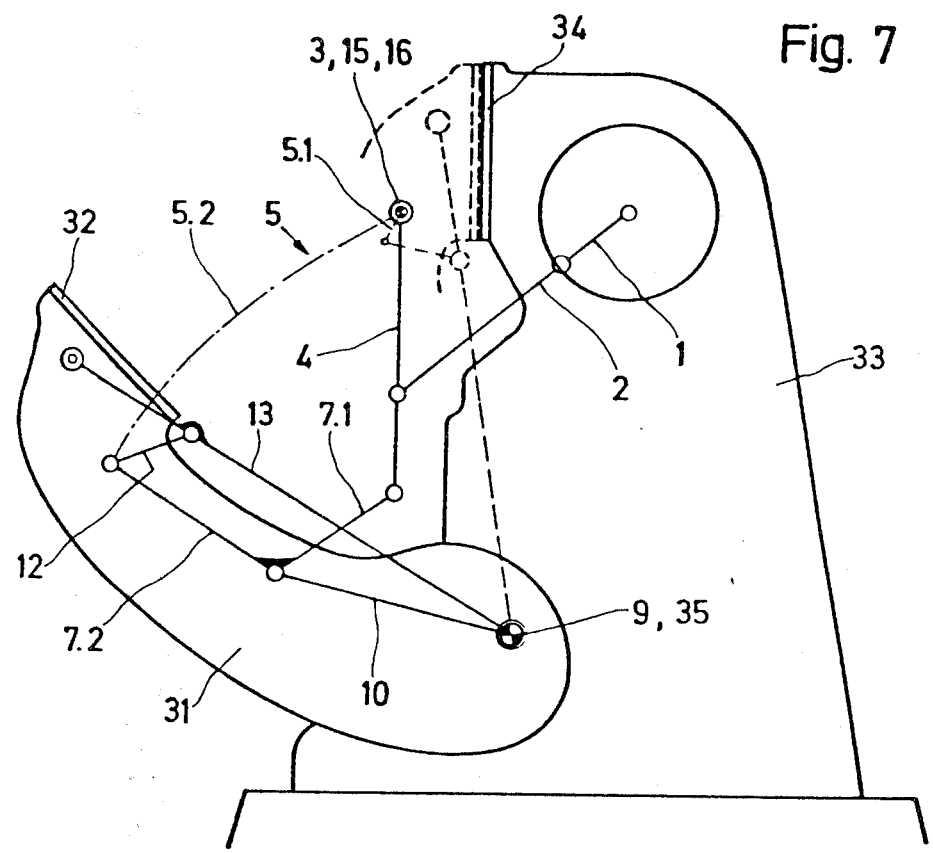
FIG. 7 is a view of the basic drive according to FIG. 1 in a first application thereof as a drive and control mechanism for an embossing platen of a platen printing press.

A first application of the basic drive is shown in FIG. 7 wherein the output or driven rocker arm 13 is coupled to a rocking lever 31 of a platen 32 of a platen printing press 33. The dwell position thereof, in this regard, corresponds to the position in which the platen 32 is on the impression plate 34, it being important, especially in the case of embossing platens, for the contact force of the platen 32 to be kept at a constant value as much as possible during the printing and embossing operations, respectively. The basic drive 4, 7, 10, 12, 13, in the instant application thereof, is powered by way of a driving crank 1 as well as a coupler 2, for example.

The pivot or articulating points 35 and 9 of the output or driven rocker arm 13 and the second rocker arm 10 of the four bar linkage are combined in the interest of simplicity. Likewise, in this special case, the frame-fixed pivot point 3 of the driving rocker arm 4 is identical with the point or vertex 15 of the couple curve 5 which is simultaneously the instantaneous pole or origin 16.

Figure 8:
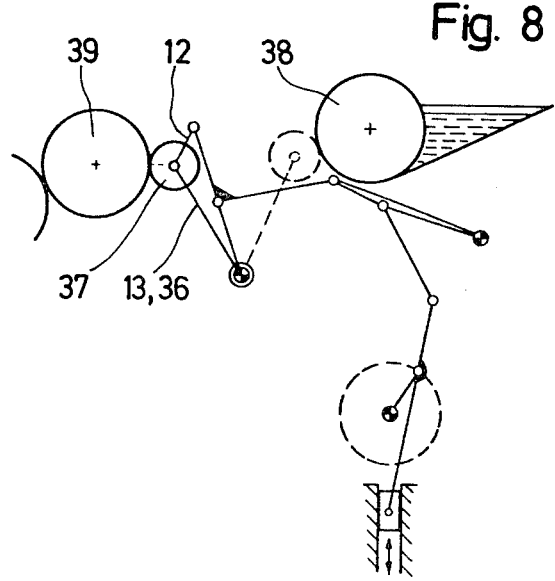
FIG. 8 is a view of a two-dwell drive according to FIG. 5 for driving an ink or dampening roll ductor roller in an offset or letterpress printing press.

An exemplary application of the compound dwell coupler drive according to FIG. 5 is finally shown in FIG. 8. The output or driven rocker arm 13 of the dwell-producing rocker arm pair 12, 13 is suitable with a specially good effect as a rocker lever 36 for an ink or dampening liquid ductor roller 37 in an offset or letterpress printing press. With respect to the perfection of at least one dwell, such a system is of equal value as a substitute for a cam driving system conventionally employed heretofore for this purpose. In this respect, the compound dwell coupler drive may be so disposed that, to meet the requirements, the dwell of greater perfection coincides with the engagement of the ductor roller 37 against an ink fountain roller 38 or, also, with the engagement thereof against the following inking unit roller 39.

Figure 9:
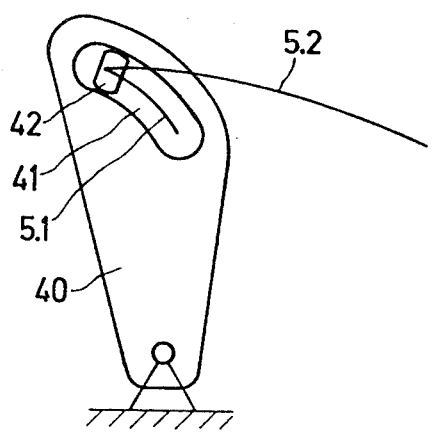
FIG. 9 is yet another embodiment of the drive wherein motion transfer and dwell production are effected with only one driven arm.

For the aforementioned as well as other applications, if desired or required, there exists also the possibility shown in FIG. 9 of combining the dwell-producing rocker arm 12 and the driven rocker arm 13 into one component. The driven lever 40 thus formed is provided for this purpose with a guide slot 41 corresponding to the dwell-producing short curve path 5.1 wherein an end 11 of the driven-side couple arm 7.2 of the rocking four-bar linkage is movable as a sliding block 42. If the four-bar linkage is simultaneously formed as a boring or milling tool, the exact guide slot 41 is able to be produced in the driven lever 40. Absolute dwell accuracy is accordingly assured.

As mentioned hereinbefore, the invention is not limited to the embodiments and applications shown in the drawings and described in the specification. The universal basic drive for producing the couple curve permits the most varied drive combinations, namely with a preceding multi-bar linkage, so that, starting from a point of a couple, thrust or circular movement, the appropriate effect or derivation may result for the basic drive. Especially in the case of the embodiment of FIG. 5, the derivation of motion (drive) may result from any desired point of a thrust plane.

Furthermore, in varying the respective drive geometry, manifold diverse possibilities exist for combining or assembling various pivot or articulating points on the frame. Furthermore, employing this drive according to the invention, it is quite simple for the dwell produced by a rocking motion of the output or driven rocker arm to be converted to a dwell of a stroke movement of a plunger guided in longitudinal direction thereof.

I claim:

1. Drive for producing motion with intervening dwells comprising a four-bar linkage defining a couple curve travel path traversible only in part and having equally coincident forward and return paths, and a dwell-producing driven rocker arm pair connected thereto, the couple curve travel path having a vertex therein dividing said couple curve travel path into a short curve path for producing a dwell and an elongated curve path extending at an angle to the short curve path for producing a movement, said vertex of said couple curve being identical with an instantaneous pole defining the start and end of the dwell.

2. Drive according to claim 1, wherein said four-bar linkage includes a bellcrank coupler having two arms with a connection point therebetween, one of said arms being connected at an articulating point to a driving rocker arm of said four-bar linkage, the other of said arms being an output arm, another rocker arm of said four-bar linkage being articulatingly connected at said connection point to said bellcrank coupler, the dwell-producing driven rocker arm pair including a dwell-producing rocker arm articulatingly connected to said output arm of said bellcrank coupler, the dwell-producing driven rocker arm pair further including an output rocker arm articulatingly connected to said dwell-producing rocker arm thereof.

3. Drive according to claim 2, wherein said four-bar linkage includes a driving rocker arm, and including a thrust crank drive having a coupler connected to said driving rocker arm of said four-bar linkage.

4. Drive according to claim 3, including a circular-arcuate adjustment slide disposed on said driving rocker arm of said four-bar linkage, said coupler of said thrust crank drive being connected to said driving rocker arm of said four-bar linkage via a connecting point of said adjustment slide, said connecting point being shiftable at said adjustment slide for adjusting dwell time between a maximum value and zero without varying an output rocker arm angle swept by said output rocker arm of said dwell-producing rocker arm pair.

5. Drive according to claim 4, including means for adjusting the dwell time during operation of the drive.

6. Drive according to claim 2, wherein said other rocker arm of said four-bar linkage is directly connected by a slide to a driving crank.

7. Drive according to claim 2, including a further dwell drive connected to a dwell-producing basic drive formed of an assembly of said four-bar linkage and said dwell-producing driven rocker arm pair, said further dwell drive being connected via a connecting rod to a couple point with said dwell-producing basic drive and being actuable for producing two dwell angles and an output rocker arm angle, and a thrust crank drive having a centric couple curve for driving said further dwell drive.

8. Drive according to claim 7, including means for taking power for driving said further dwell drive from a rectilinear thrust crank movement at any location of a thrust plane.

9. Drive according to claim 8 in combination with an embossing platen of a platen printing press, said output rocker arm of said dwell-producing rocker arm pair forming a driving link for the embossing platen, and means for effecting a dwell of said output rocker arm during embossing operation of said platen printing press.

10. Drive according to claim 7 in combination with an inking or dampening unit of a printing machine, said output rocker arm of said dwell producing basic drive and said further dwell drive for producing two dwells forming a rocking lever for a ductor roller in the inking or dampening unit, and positions of said ductor roller being identical with positions of said dwells.

11. Drive according to claim 1, including a driven lever for transmitting motion in accordance with said elongated curve path and for producing a dwell in accordance with said short curve path, said driven lever being formed with a guide slot corresponding to said dwell-producing short curve path, said four-bar linkage including a bellcrank coupler having an output arm with an end articulatingly connected to a slide block slideable in said guide slot.

* * * * *